US010223550B2

(12) United States Patent
Staykov et al.

(10) Patent No.: US 10,223,550 B2
(45) Date of Patent: Mar. 5, 2019

(54) GENERATING CANONICAL REPRESENTATIONS OF JSON DOCUMENTS

(71) Applicant: VMware, Inc., Palo Alto, CA (US)

(72) Inventors: Georgi Staykov, Sofia (BG); Jeffrey Hu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 622 days.

(21) Appl. No.: 14/073,143

(22) Filed: Nov. 6, 2013

(65) Prior Publication Data

US 2015/0128032 A1    May 7, 2015

(51) Int. Cl.
G06F 21/64    (2013.01)

(52) U.S. Cl.
CPC .................... G06F 21/64 (2013.01)

(58) Field of Classification Search
CPC ....................................... G06F 21/64
USPC ......................................... 715/239
See application file for complete search history.

(56) References Cited

U.S. PATENT DOCUMENTS

| | | | | |
|---|---|---|---|---|
| 9,025,892 B1* | 5/2015 | Lightner | ................. | H03M 7/30 382/232 |
| 2006/0041422 A1* | 2/2006 | Davis | .................... | G06F 17/275 704/9 |
| 2006/0236225 A1* | 10/2006 | Achilles | ................ | G06F 17/272 715/205 |
| 2006/0277459 A1* | 12/2006 | Lemoine | ............... | G06F 17/227 715/234 |
| 2009/0037876 A1* | 2/2009 | Meijer | ...................... | G06F 8/33 717/113 |
| 2010/0185869 A1* | 7/2010 | Moore | ................. | H04L 9/3236 713/179 |
| 2010/0293385 A1* | 11/2010 | Nanda | ................... | H04L 63/166 713/176 |
| 2011/0231824 A1* | 9/2011 | Chabbi | ............... | G06F 11/0751 717/126 |
| 2012/0198234 A1* | 8/2012 | Chung | ................. | H04L 9/3247 713/171 |

(Continued)

OTHER PUBLICATIONS

A Dictionary of Computing, Sixth Edition, Oxford University Press, 2008, p. 343.*

(Continued)

*Primary Examiner* — Frank D Mills
(74) *Attorney, Agent, or Firm* — Fish & Richardson P.C.

(57) ABSTRACT

Systems and techniques are described for generating canonical representations of JSON documents. One of the techniques includes receiving a first JavaScript Object Notation (JSON) document, wherein the first document includes one or more JSON objects, and wherein each JSON object includes one or more name-value pairs; generating a first canonical representation of the first JSON document, wherein generating the first canonical representation comprises: removing each non-significant whitespace character and non-significant line ending from the first document, for each JSON object, sorting the name-value pairs included in the JSON object lexicographically, and converting one or more instances of a number value type in the first document into a standardized representation of a double data type; and generating a first digital signature for the first JSON document using the first canonical representation.

19 Claims, 4 Drawing Sheets

(56) References Cited

U.S. PATENT DOCUMENTS

| | | | | |
|---|---|---|---|---|
| 2013/0036476 A1* | 2/2013 | Roever | ............... | H04L 63/08 |
| | | | | 726/27 |
| 2013/0097157 A1* | 4/2013 | Ng | ............... | G06F 17/30554 |
| | | | | 707/723 |
| 2014/0020064 A1* | 1/2014 | Hildebrand | ......... | G06F 21/335 |
| | | | | 726/4 |
| 2014/0207826 A1* | 7/2014 | Gao | ............ | G06F 17/30292 |
| | | | | 707/803 |
| 2014/0244674 A1* | 8/2014 | Mollis | ............ | G06F 17/30569 |
| | | | | 707/756 |
| 2015/0006346 A1* | 1/2015 | Amancherla | ........ | G06Q 40/02 |
| | | | | 705/35 |

OTHER PUBLICATIONS

Boyer, Canonical XML Version 1.0, W3C Recommendation, Mar. 15, 2001, retrieved from https://www.w3.org/TR/xml-c14n.*
Dainith et al., Oxford Dictionary of Computing, 6th Ed., Oxford University Press, 2008, p. 158; 286; 343.*
Crockford, The application/json Media Type for JavaScript Object Notation (JSON), RFC 4627, The Internet Society, 2006, p. 1-9.*
Boyer et al., Canonical XML Version 1.1, W3C Recommendation, May 2, 2008, p. 1-24 (retrieved from https://www.w3.org/TR/xml-c14n/). (Year: 2008).*

\* cited by examiner

Input:
{
  "foo" : "foo bar"
} ⎬ 302

Canonical representation:
{"foo":"foo bar"} ⎬ 308

Input:
{
  "foo":"bar",
  "abc":"def",
  "zoo" :
    [
      "def",
      "abc"
    ]
} ⎬ 304

Canonical Representation:
{"abc":"def","foo":"bar","zoo":["def","abc"]} ⎬ 310

Input:
{
  "d1":-12.34e4,
  "d2":1E-130,
  "d3":0.0E-0,
  "d4":1.2
} ⎬ 306

Canonical Representation:
{"d1":-1.234E5,"d2":1.0E-130,"d3":0.0E0,"d4":1.2E0} ⎬ 312

FIG. 3

GENERATING CANONICAL REPRESENTATIONS OF JSON DOCUMENTS

BACKGROUND

This document relates to generating canonical representations of JSON documents.

JavaScript Object Notation (JSON) is a data-interchange format that is built on two structures, objects and arrays. A JSON object is an unordered set of name/value pairs. Each JSON object begins with a left brace ({) and ends with a right brace (}). Each name/value pair inside an object is separated by a comma (,) and, within each name/value pair, the name is followed by a colon (:). A JSON array is an ordered collection of values. Each JSON array begins with a left bracket ([) and ends with a right bracket (]). Values within an array are separated by commas (,).

Because of the structure of the JSON format, a JSON document can potentially have multiple logically equivalent physical representations. Thus, two JSON documents may be logically equivalent despite having different physical representations.

SUMMARY

In general, one aspect of the subject matter described in this document can be embodied in a technique that includes receiving a first JavaScript Object Notation (JSON) document, wherein the first document includes one or more JSON objects, and wherein each JSON object includes one or more name-value pairs; generating a first canonical representation of the first JSON document, wherein generating the first canonical representation comprises: removing each non-significant whitespace character and non-significant line ending from the first document, for each JSON object, sorting the name-value pairs included in the JSON object lexicographically, and converting one or more instances of a number value type in the first document into a standardized representation of a double data type; and generating a first digital signature for the first JSON document using the first canonical representation.

This and other aspects can optionally include one or more of the following features. The technique can further include: receiving a second JSON document, wherein the second JSON document is physically different from the first JSON document; generating a second canonical representation of the second JSON document; and determining that the first JSON document and the second JSON document are logically equivalent based on a comparison between the first canonical representation and the second canonical representation.

Generating the first canonical representation can further include: determining whether the first document is encoded in Universal Character Set Transformation Format-8-bit (UTF-8); and in response to determining that the first document is not encoded in UTF-8, transcoding the first document into UTF-8.

A white space character or line ending can be non-significant if the white space character or line ending does not appear in a name/value pair included in a JSON object or a value included in a JSON array.

Sorting the name-value pairs included in the JSON object lexicographically can include ordering the name strings for each name-value pair from least to greatest alphabetically based on Unicode Character Set (UCS) codepoint values.

The first document can further include a JSON array having a plurality of values in a particular order, and wherein generating the first canonical representation further comprises: maintaining the particular order of the plurality of values in the JSON array.

The standardized representation of the double data type can be a representation specified in the Extensible Markup Language (XML) schema standard. Converting one or more instances of a number value type in the first document into a standardized representation of a double data type can include converting each instance of the number value type that includes a decimal point into the standardized representation.

The technique can further include: receiving a second JSON document that is associated with the first digital signature, wherein the second JSON document is physically different from the first JSON document; generating a second canonical representation of the second JSON document; generating a second digital signature for the second JSON document using the second canonical representation; and authenticating the second JSON document based on determining that the first digital signature matches the second digital signature.

Particular embodiments of the subject matter described in this document can be implemented so as to realize one or more of the following advantages. By generating canonical representations of JSON documents, documents that are logically equivalent but physically different can be easily identified. Identifying logically equivalent but physically different documents can result in improvements in, for example, digital signature generation, data de-duplication, and other techniques that require a single logical representation of a document.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows canonical representations of example portions of JSON documents.

Like reference numbers and designations in the various drawings indicate like elements.

DETAILED DESCRIPTION

This specification generally describes techniques for generating canonical representations of JSON documents, i.e., electronic documents written in the JSON data-interchange format. JSON is a lightweight data-interchange text format that is suitable for both humans and machines and allows multiple physical representations that are logically equivalent. For example, a formatting change to add whitespaces and line endings to make a document more human readable will result in a different physical representation of the document. That is, a byte by byte comparison of the original document and the resulting document will indicate that the two documents are physically different.

In some circumstances, however, it may be beneficial or necessary that two logically equivalent documents have a single physical representation. For example, when a cryptographic hash is applied over two physically different but logically equivalent JSON documents, the resulting strings for the two documents will be different. However, if variation in how logically equivalent content is encoded in JSON is removed, i.e., by converting the documents to a common physical representation before the hash is applied, the resulting strings of any two logically equivalent documents will be the same. Thus, a common physical representation of logically equivalent JSON documents is described herein and referred to as the canonical representation.

Using the generated canonical representations, two physically different documents can be compared, e.g., using a byte by byte comparison between the canonical representations for the documents, to determine whether the documents are logically equivalent.

Figure 1:
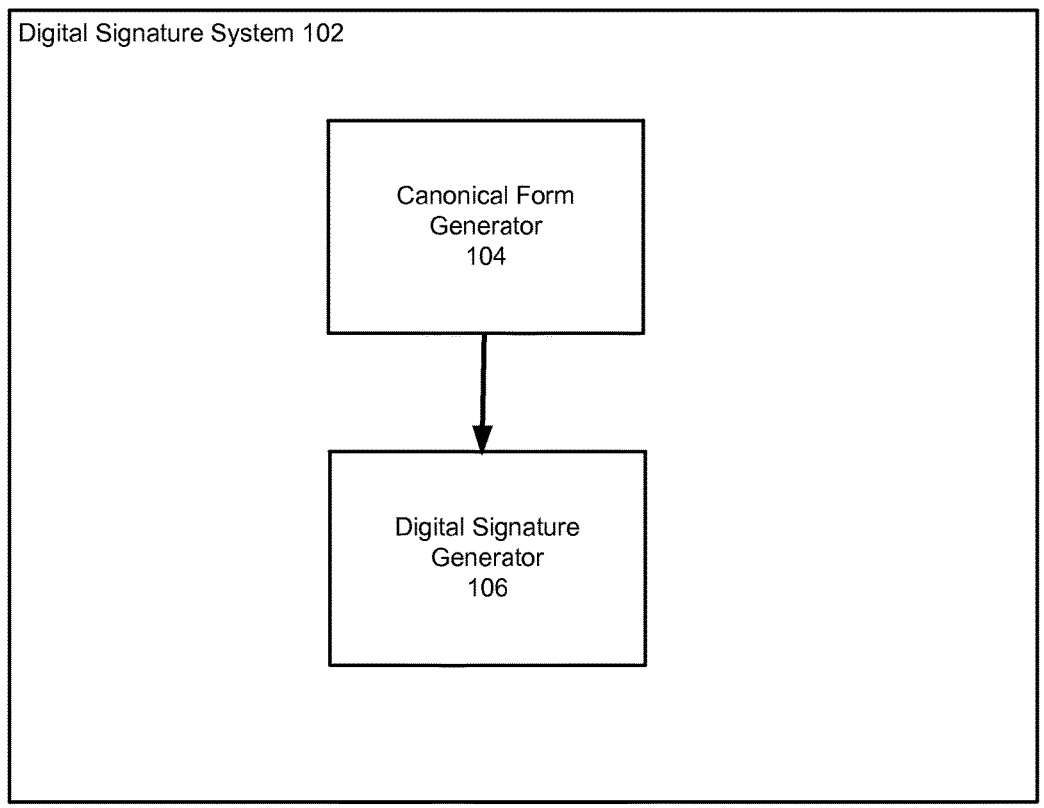
FIG. 1 shows an architecture for an example digital signature system.

FIG. 1 shows an architecture for an example digital signature system 100. The digital signature system 100 is an example of a system implemented as computer programs on one or more computers in one or more locations, in which the systems, components, and techniques described below can be implemented.

The digital signature system 100 includes a canonical form generator 104 and a digital signature generator 106. The canonical form generator 104 receives an input JSON document and generates a canonical representation of the document. Generating canonical representations of input documents will be described in more detail below with reference to FIG. 2.

Once the canonical representation of an input document has been generated, the digital signature generator 106 uses the canonical representation to digitally sign the document. That is, the digital signature generator 106 generates a digital signature for the canonical representation, and uses that digital signature as the digital signature for the input document. A digital signature for a document is a piece of data used to verify the authenticity of the document. For example, in order to generate the digital signature for an input document, the digital signature generator 106 can generate a cryptographic hash of the canonical representation of the document and encrypt the hash.

By using the signature for the canonical representation of an input document as the digital signature for the input document, documents that are physically different but logically equivalent will be associated with the same digital signature. For example, the input documents may be JSON documents generated from a serialization or deserialization library that tolerates variation in physical representation. Because of this, different physical representations of the same document may be produced after several serialization or deserialization cycles. By generating the digital signature for the input documents using their canonical representations, false signature verification failures between these physically different documents will be avoided.

Figure 2:
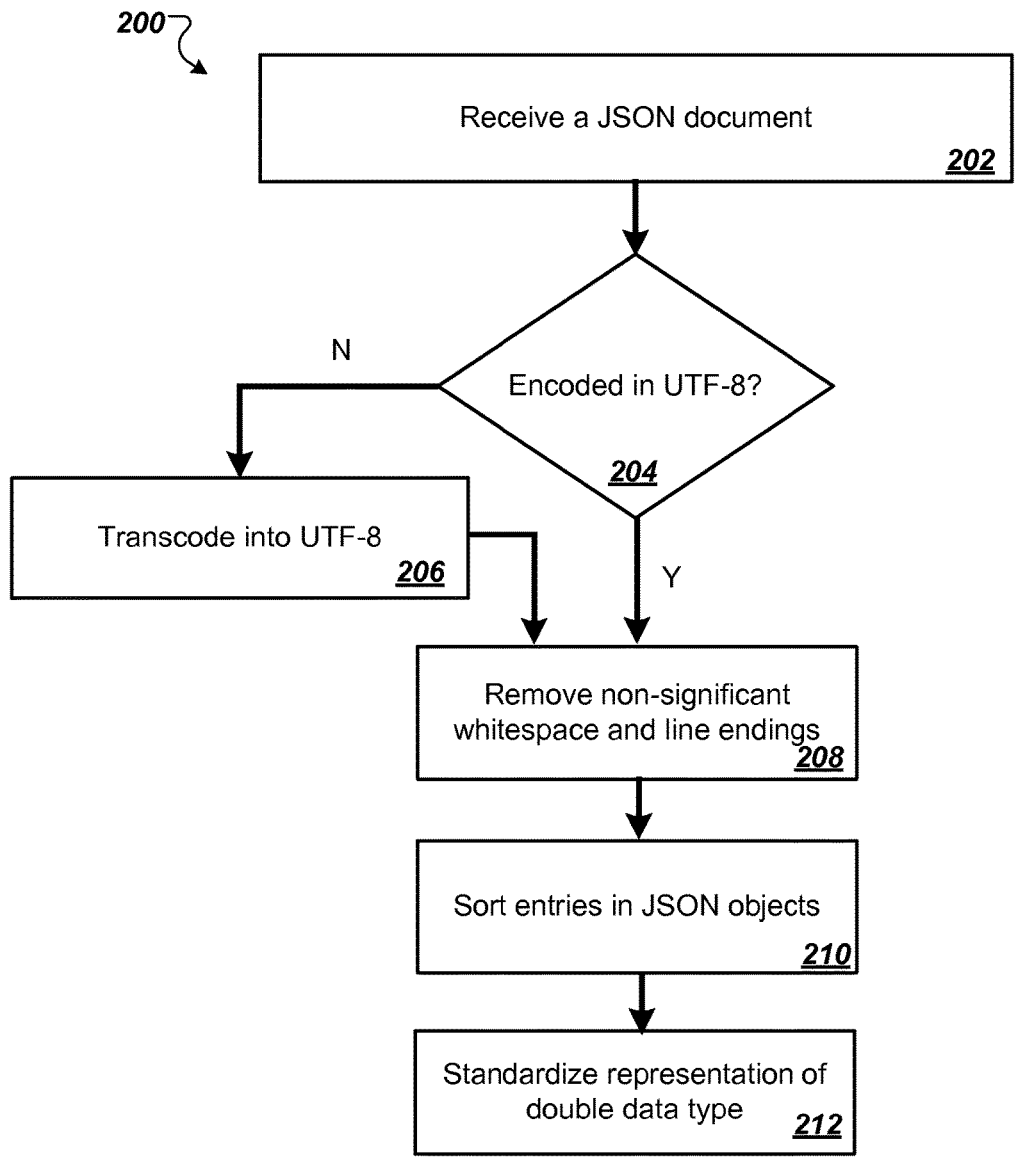
FIG. 2 is a flowchart of an example technique for generating a canonical representation of a JSON document.

FIG. 2 is a flowchart of an example technique 200 for generating a canonical form of a JSON document. The technique 200 can be performed by a system of one or more computers located in one or more locations. For example, a digital signature system, e.g., the digital signature system 100 of FIG. 1, can perform the process 200.

At step 202, the system receives a JSON document. The JSON document includes one or more JSON objects, one or more JSON arrays, or both.

At step 204, the system determines whether the document is encoded in Universal Character Set Transformation Format-8-bit (UTF-8).

At step 206, if the document is not encoded in UTF-8, the system transcodes the document into UTF-8 using, e.g., conventional transcoding techniques. Once the document has been transcoded into UTF-8, the technique 200 proceeds to step 208.

At step 208, once the document is encoded in UTF-8, the system removes all of the non-significant whitespace characters and non-significant line endings from the document. A whitespace character or a line-ending is considered non-significant if the whitespace character or line ending does not appear in a name/value pair included in a JSON object or a value included in a JSON array. Thus, while the system removes whitespace characters that are not included in a name/value pair or a value, the system preserves any whitespace characters or line endings that are inside name/value pairs or values.

At step 210, the system sorts the entries in any JSON objects that are included in the document lexicographically. In particular, within each JSON object, the system orders the name-value pairs by sorting the corresponding name string for each pair from least to greatest alphabetically based on Unicode Character Set (UCS) codepoint values. However, because the values within each JSON array are ordered, the system does not re-arrange the order of any values inside any JSON arrays that are in the document. That is, the system maintains the order of the values inside any JSON arrays in the document.

At step 212, the system converts all number value types that include a decimal point to a standardized representation of the double data type. While JSON does not support a double data value type and supports only a number value type for representing numeric values, the system converts all instances of the number value type that include a decimal point in the JSON document so that they are compliant with a standardized representation of the double data type.

For example, the standardized representation of the double data type can be the representation specified in the Extensible Markup Language (XML) schema standard. The XML schema standard specifies that each double data type value consist of a mantissa followed by "E", followed by the exponent, e.g., "1.0E-130." Additional requirements of the XML schema standard include that the mantissa must be represented as a decimal, i.e., each mantissa must include a decimal point and there must be at least one digit to the right of the decimal point, and that, for each non-zero value, the mantissa must include exactly one non-zero digit to the left of the decimal point. Additionally, the standard specifies that the zero exponent be represented by "E0," that the "+" sign is prohibited in both the mantissa and the exponent, and that leading zeroes are prohibited from being included on the left side of the decimal point in the mantissa and in the exponent. Additionally, the standard specifies that special values (e.g., "NaN" and "INF") not be used in representations of numerical values.

The order of steps in the technique 200 described above is illustrative only, and steps 208, 210, and 212 can be performed in any order. For example, the system may sort the entries in the JSON object prior to removing non-significant whitespace or after removing the non-significant whitespace characters.

FIG. 3 shows canonical representations of example portions of JSON documents. In particular, FIG. 3 shows example input portions 302, 304, and 306, and their respective canonical representations 308, 310, and 312. The canonical representations 308, 310, and 312 were generated from the input portions 302, 304, and 306 by a digital signature system using the technique 200.

The example input portion 302 shows a JSON object that consists of the name-value pair "foo": "foo bar." In the canonical representation 308 of the input portion 302, all of the non-essential whitespace characters and line endings have been removed, while the whitespace character in "foo bar" has been preserved.

The example input portion 304 shows a JSON object that consists of three name-value pairs. The value of one of the name value pairs is a JSON array: "zoo": ["def", "abc"]. In the canonical representation 310 of the input portion 304, non-essential whitespace has been removed and the name-value pairs in the JSON object have been sorted lexicographically based on the name strings of the name-value pairs. However, the order of the values within the array ["def","abc"] has been preserved.

The example input portion 306 shows a JSON object that includes three name-value pairs, the value of each of which is a numerical value represented in the JSON number type. In the canonical representation 312 of the input portion 306, all of the non-essential whitespace characters have been removed and each of the numerical values are represented in a standardized representation of the double data type.

Figure 4:
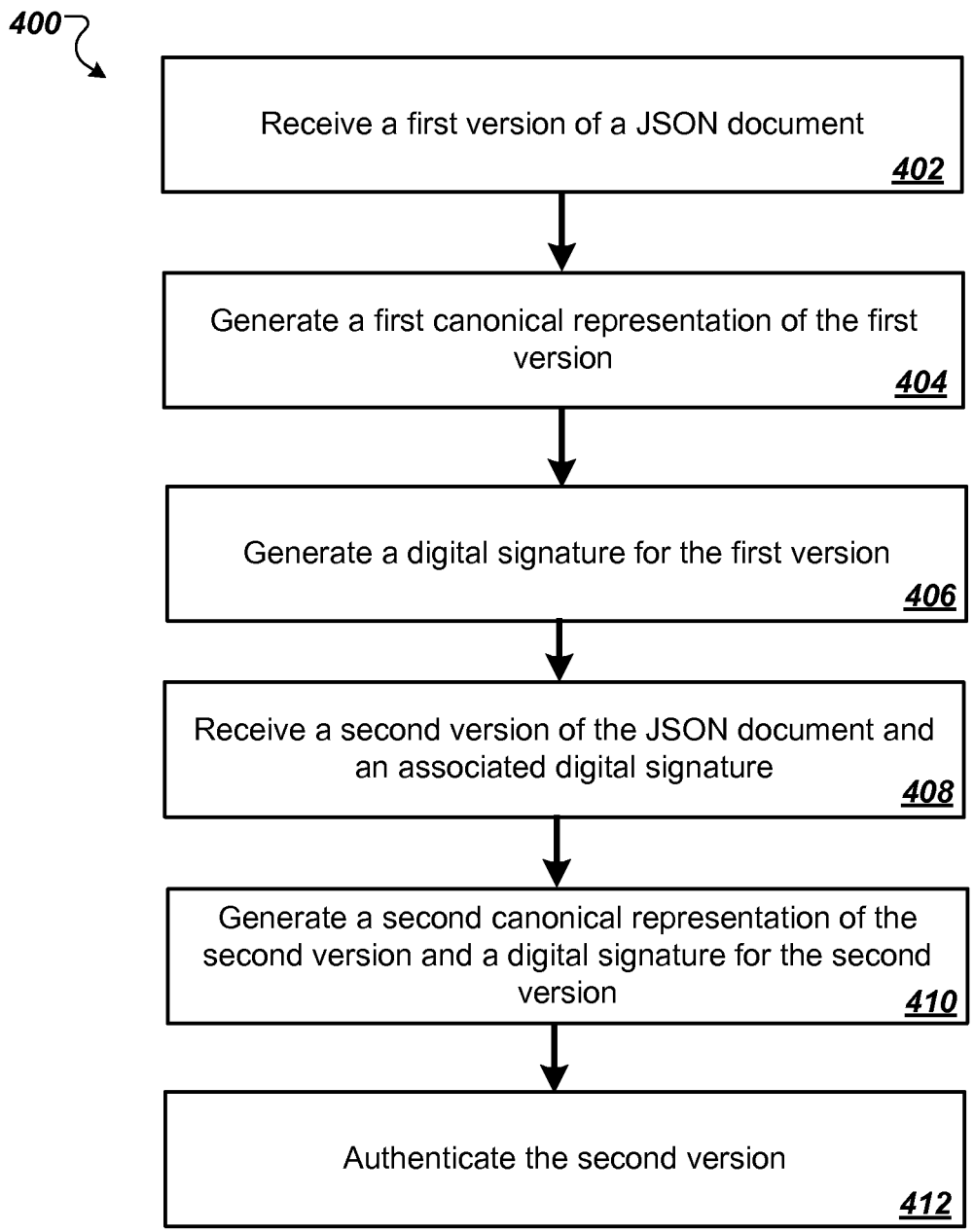
FIG. 4 is a flowchart of an example technique for verifying the authenticity of an input document.

FIG. 4 is a flowchart of an example technique 400 for verifying the authenticity of an input document. The technique 400 can be performed by a system of one or more computers located in one or more locations. For example, a digital signature system, e.g., the digital signature system 100 of FIG. 1, can perform the process 400.

The system receives a first version of an input document (step 402).

The system generates a first canonical representation of the first version (step 404), e.g., as described above with reference to FIG. 2.

The system generates a digital signature for the first version using the canonical representation (step 406).

The system receives a second version of the input document and an associated digital signature (step 408). The second version is physically different from the first version while the digital signature is the same as the digital signature generated for the first version. For example, the second version may have been generated one or more additional serialization cycles after the first version.

The system generates a second canonical representation of the second version of the input document and a digital signature for the second version using the second canonical representation (step 410).

The system authenticates the second version of the document by comparing the digital signatures (step 412). That is, because the digital signature for the second version matches the digital signature for the first version, the system determines that the second version is authentic despite being physically different from the first version.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
receiving a first JavaScript Object Notation (JSON) document, wherein the first document includes a plurality of JSON objects including one or more JSON arrays, and wherein each JSON object includes one or more name-value pairs;
generating a first canonical representation of the first JSON document, wherein generating the first canonical representation comprises performing operations including removing non-significant whitespace, sorting entries, and converting number value types, each of which respectively comprise:
removing each non-significant whitespace character and non-significant line ending from the first document, wherein significant whitespace characters and line endings are preserved including determining whether whitespace characters are located within the one or more JSON object name-value pairs and values included in the one or more JSON arrays of the first JSON document,
for each JSON object, sorting the name-value pairs included in the JSON object lexicographically, without re-arranging an order of values inside the one or more JSON arrays that comprise the value of a name value pair, and
converting one or more instances of a number value type in the first document into a standardized representation of a double data type;
generating a first digital signature for the first JSON document using the first canonical representation;

receiving a second JSON document and a second digital signature, the second digital signature being generated from a second canonical representation of the second JSON document; and using the first digital signature and the second digital signature to compare the first JSON document to the second JSON document, wherein the second JSON document has a physically different structure than the first JSON document, to determine if the first JSON document and the second JSON document have the same digital signatures indicating the documents are logically equivalent.

2. The method of claim 1, wherein generating the first canonical representation further comprises:

determining whether the first document is encoded in Universal Character Set Transformation Format-8-bit (UTF-8); and in response to determining that the first document is not encoded in UTF-8, transcoding the first document into UTF-8.

3. The method of claim 1, wherein a whitespace character or line ending is non-significant if the whitespace character or line ending does not appear in the name-value pair included in a JSON object or the value included in a JSON array.

4. The method of claim 1, wherein sorting the name-value pairs included in the JSON object lexicographically comprises ordering the name strings for each name-value pair from least to greatest alphabetically based on Unicode Character Set (UCS) codepoint values.

5. The method of claim 1, wherein each of the one or more JSON arrays have a plurality of values in a particular order, and wherein generating the first canonical representation further comprises: maintaining the particular order of the plurality of values in the JSON array.

6. The method of claim 1, wherein the standardized representation of the double data type is a representation specified in the Extensible Markup Language (XML) schema standard.

7. The method of claim 1, wherein converting one or more instances of a number value type in the first document into a standardized representation of a double data type comprises converting each instance of the number value type that includes a decimal point into the standardized representation.

8. The method of claim 1, further comprising:

receiving a second JSON document that is associated with the first digital signature, wherein the second JSON document is physically different from the first JSON document;

generating a second canonical representation of the second JSON document;

generating a second digital signature for the second JSON document using the second canonical representation; and authenticating the second JSON document based on determining that the first digital signature matches the second digital signature.

9. A system comprising:

data processing apparatus, including one or more processors and one or more computer readable storage media, programmed to perform operations comprising:

receiving a first JavaScript Object Notation (JSON) document, wherein the first document includes a plurality of JSON objects including one or more JSON arrays, and wherein each JSON object includes one or more name-value pairs; and generating a first canonical representation of the first JSON document, wherein generating the first canonical representation comprises performing operations including removing non-significant whitespace, sorting entries, and converting number value types, each of which respectively comprise:

removing each non-significant whitespace character and non-significant line ending from the first document, wherein significant whitespace characters and line endings are preserved including determining whether whitespace characters are located within the one or more JSON object name-value pairs and values included in the one or more JSON arrays of the first JSON document, for each JSON object, sorting the name-value pairs included in the JSON object lexicographically, without re-arranging an order of values inside the one or more JSON arrays that comprise the value of a name value pair, and converting one or more instances of a number value type in the first document into a standardized representation of a double data type;

generating a first digital signature for the first JSON document using the first canonical representation;

receiving a second JSON document and a second digital signature, the second digital signature being generated from a second canonical representation of the second JSON document; and using the first digital signature and the second digital signature to compare the first JSON document to the second JSON document, wherein the second JSON document has a physically different structure than the first JSON document to determine if the first JSON document and the second JSON document have the same digital signatures indicating the documents are logically equivalent.

10. The system of claim 9, wherein a whitespace character or line ending is non-significant if the whitespace character or line ending does not appear in the name-value pair included in a JSON object or the value included in a JSON array.

11. The system of claim 9, wherein sorting the name-value pairs included in the JSON object lexicographically comprises ordering the name strings for each name-value pair from least to greatest alphabetically based on Unicode Character Set (UCS) codepoint values.

12. The system of claim 9, wherein the standardized representation of the double data type is a representation specified in the Extensible Markup Language (XML) schema standard.

13. The system of claim 9, wherein converting one or more instances of a number value type in the first document into a standardized representation of a double data type comprises converting each instance of the number value type that includes a decimal point into the standardized representation.

14. A non-transitory machine readable storage medium embodying computer software, the computer software causing a computer to perform a method, the method comprising:

receiving a first JavaScript Object Notation (JSON) document, wherein the first document includes a plurality of JSON objects including one or more JSON arrays, and wherein each JSON object includes one or more name-value pairs;

generating a first canonical representation of the first JSON document, wherein generating the first canonical representation comprises performing operations including removing non-significant whitespace, sorting entries, and converting number value types, each of which respectively comprise:
  removing each non-significant whitespace character and non-significant line ending from the first document, wherein significant whitespace characters and line endings are preserved including determining whether whitespace characters are located within the one or more JSON object name-value pairs and values included in the one or more JSON arrays of the first JSON document,
  for each JSON object, sorting the name-value pairs included in the JSON object lexicographically, without re-arranging an order of values inside the one or more JSON arrays that comprise the value of a name value pair, and
  converting one or more instances of a number value type in the first document into a standardized representation of a double data type;
generating a first digital signature for the first JSON document using the first canonical representation;
receiving a second JSON document and a second digital signature, the second digital signature being generated from a second canonical representation of the second JSON document; and
using the first digital signature and the second digital signature to compare the first JSON document to the second JSON document, wherein the second JSON document has a physically different structure than the first JSON document, to determine if the first JSON document and the second JSON document have the same digital signatures indicating the documents are logically equivalent.

15. The storage medium of claim 14, wherein a whitespace character or line ending is non-significant if the whitespace character or line ending does not appear in the name-value pair included in a JSON object or the value included in a JSON array.

16. The storage medium of claim 14, wherein sorting the name-value pairs included in the JSON object lexicographically comprises ordering the name strings for each name-value pair from least to greatest alphabetically based on Unicode Character Set (UCS) codepoint values.

17. The storage medium of claim 14, wherein the standardized representation of the double data type is a representation specified in the Extensible Markup Language (XML) schema standard.

18. The storage medium of claim 14, wherein converting one or more instances of a number value type in the first document into a standardized representation of a double data type comprises converting each instance of the number value type that includes a decimal point into the standardized representation.

19. The storage medium of claim 14, the operations further comprising:
  receiving a second JSON document that is associated with the first digital signature, wherein the second JSON document is physically different from the first JSON document;
  generating a second canonical representation of the second JSON document;
  generating a second digital signature for the second JSON document using the second canonical representation; and
  authenticating the second JSON document based on determining that the first digital signature matches the second digital signature.

* * * * *